3,371,025
PROCESS FOR THE PRODUCTION OF 1-BROMO-HEPTAFLUOROCYCLOPENTENE-1

John Colin Tatlow, Robert Stephens, and Douglas Robert Anthony Perry, Birmingham, England, assignors to Hooker Chemical Corporation, Niagara Falls, N.Y., a corporation of New York
No Drawing. Filed Aug. 6, 1964, Ser. No. 388,002
2 Claims. (Cl. 204—163)

The present invention relates to 1-bromoheptafluorocyclopentene-1 and a process for the preparation thereof.

In accordance with a process aspect of the invention a process for the preparation of 1-bromoheptafluorocyclopentene comprises reacting 1H-heptafluorocyclopentene-1 (also called 2,3,3,4,4,5,5-heptafluorocyclopentene) with bromine under irradiating conditions. The reaction occurring is illustrated by the following equation:

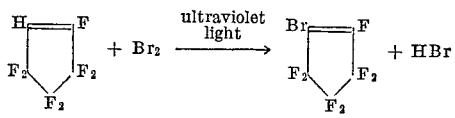

The temperature utilized for effecting the reaction, which can vary over broad ranges, affects to an extent the yield and purity of the product obtained. The type and intensity of irradiation also have such effect. Generally, suitable temperatures are in the range of about −20 degrees centigrade to about +50 degrees centigrade, and preferably are from about −15 to +20 degrees centigrade. The molar ratios of starting reactants also affect the yield and purity of product. Usually, the molar ratios will be about 0.5:1 to about 2:1 moles of bromine per mole of 1H-heptafluorocyclopentene-1. Of course, it is appreciated that other molar ratios, such as further excesses of bromine, can be utilized provided that they do not seriously adversely affect the reaction mechanism. The reaction completeness is determined from hydrogen bromide (or bromine) taken off.

Irradiating conditions are employed for promoting the reaction. Any of the well-known commerical light sources which will induce or speed up the bromination reaction may be used, such as tungsten filament lamps, ultraviolet lamps such as mercury vapor arc lamps including fluorescent lamps, and the like. The preferred light source, however, is light having a wave length from about 300 to 700 millimicrons.

Pressures employed in effecting the process of the present invention are about atmospheric, but sub- or super-atmospheric pressures such as 0.5 to 2 atmospheres, may be employed. The pressure can be as low as the vapor pressure of the starting material at the operating temperatures.

The product produced in accordance with the process of this invention is separated from the reaction mixture by methods known in this art, such as by gas chromatographic separation, distillation, solvent extraction, and the like.

In another embodiment of the present invented processes the novel 1-bromohetafluorocyclopentene-1 can be prepared by the dehydrohalogenation of 1H-1,2-dibromoheptafluorocyclopentane. The dehydrohalogenation is accomplished in the presence of an alkali reactant such as alkali metal hydroxides, i.e., including sodium hydroxide, potassium hydroxide, lithium hydroxide, and the like, and temperature from about −20 degrees centigrade to about +25 degrees centigrade. The reaction occurring is illustrated by the following equation:

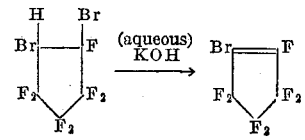

The starting reactant for the bromination reaction previously described, 1H-heptafluorocyclopentene-1, may be prepared as described in J. Chem. Society, p. 286, 1963, which involves the dehydrofluorination of 1H, 2H-octafluorocyclopentane.

1-bromoheptafluorocyclopentene-1 is useful as an additive for imparting flame retardant properties to polymers, such as polypropylene, and as an intermediate in the preparation of polymers of hexafluorocyclopentadiene, which polymers are useful in the preparation of high temperature resistant elastomers.

In the specification, examples and claims, parts are by weight and temperatures are in degrees centigrade unless otherwise specified.

In order that those skilled in the art may better understand the present invention and the manner in which it may be practiced, the following illustrative examples are given.

Example 1.—*Bromination of 1H-heptafluorocyclopentene*

1H-heptafluorocyclopentene (12.0 grams) and bromine (20.5 grams) were sealed in a hard glass tube and irradiated with ultraviolet light for 96 hours. On opening the tube, fumes of hydrogen halide were evolved. Excess bromine was destroyed by washing with sodium bisulfite and finally water (a large proportion of bromine could have been recovered at this stage by separation of the bottom bromine layer from the organic layer). The organic product (13.3 grams) on examination by analytical gas chromatography contained major components whose retention times were consistent with (1) 1H-heptafluorocyclopentene; (2) 1-bromoheptafluorocyclopentene; and (3) 1H-1,2-dibromoheptafluorocyclopentane.

A cooled solution of potassium hydroxide (40 grams in 40 milliliters water) was added carefully to this mixture (40 grams). Reaction, which was spontaneous, was carried to completion by refluxing for a further one hour. The product (31.6 grams) was washed with water and separated (30.5 grams) by preparative gas chromatography (copper 35 millimeters tube at 92 degrees and nitrogen flow of 17 liters/hour) to yield (1) 1H-heptafluorocyclopentene (17.2 grams); (2) 1-bromoheptafluorocyclopentene (10.2 grams); (3) minor products (0.7 gram). Reseparation of mixture (3) (1.0 gram) (on the same column at 98 degrees and nitrogen flow of 15.3 liters/hour) yielded (1) unknown (0.1 gram); (2) 1,5-dibromohexafluorocyclopentene (0.3 gram); (3) 1,2-dibromohexafluorocyclopentene (0.2 gram).

Example 2.—*Dehydrohalogenation of 1H-1,2-dibromoheptafluorocyclopentane*

Ten parts of potassium hydroxide were dissolved in 10 parts of water and 5.7 parts of 1H-1,2-dibromoheptafluorocyclopentane were added. The mixture was refluxed at 112 degrees centigrade for 0.5 hour. The product (4.7 parts) was identified as 1-bromoheptafluorocyclopentene-1 by gas chromatography.

While there have been described various embodiments of the invention, the methods and elements described are not intended to be understood as limiting the scope of the invention, as it is realized that changes therewithin are possible, and it is further intended that each element recited in any of the following claims is to be understood as referring to all equivalent elements for accomplishing substantially the same results in substantially the same or equivalent manner, it being intended to cover the invention broadly in whatever form its principle may be utilized.

What is claimed is:

1. A process for the preparation of 1-bromoheptafluorocyclopentene-1 which comprises reacting bromine and 1H-heptafluorocyclopentene-1 at a temperature in the range of −20 to +50 degrees centigrade while irradiating the reaction mixture with light at a wavelength of 300 to 700 millimicrons and subsequently recovering the product from the reaction mixture.

2. A process for the preparation of 1-bromoheptafluorocyclopentene-1 which comprises reacting bromine and 1H-heptafluorocyclopentene-1 at a temperature in the range of −15 degrees centigrade to about 20 degrees centigrade while irradiating the reaction mixture with ultraviolet light.

References Cited

UNITED STATES PATENTS 3,193,587  7/1965  Baranauckas et al. __ 260—648
3,192,274  6/1965  Baranauckas et al. __ 260—653

OTHER REFERENCES

Morrison et al.: Organic Chemistry, pp. 153 to 155 (1959).

LEON ZITVER, *Primary Examiner.*

M. M. JACOB, *Assistant Examiner.*